United States Patent
Akiyama

(10) Patent No.: US 11,912,228 B2
(45) Date of Patent: Feb. 27, 2024

(54) OCCUPANT CRASH PROTECTION FOR VEHICLE

(71) Applicant: Toyota Jidosha Kabushiki Kaisha, Toyota (JP)

(72) Inventor: Fumito Akiyama, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/399,509

(22) Filed: Aug. 11, 2021

(65) Prior Publication Data

US 2022/0097645 A1  Mar. 31, 2022

(30) Foreign Application Priority Data

Sep. 29, 2020  (JP) ................. 2020-163903

(51) Int. Cl.
*B60R 21/231* (2011.01)
*B60R 21/207* (2006.01)

(52) U.S. Cl.
CPC ...... *B60R 21/23138* (2013.01); *B60R 21/207* (2013.01); *B60R 2021/23107* (2013.01); *B60R 2021/23146* (2013.01); *B60R 2021/23161* (2013.01)

(58) Field of Classification Search
CPC ............ B60R 21/23138; B60R 21/207; B60R 2021/23107; B60R 2021/23146
See application file for complete search history.

(56) References Cited

U.S. PATENT DOCUMENTS

| | | | |
|---|---|---|---|
| 5,324,072 A | 6/1994 | Olson et al. | |
| 2004/0232666 A1* | 11/2004 | Sato | B60R 21/23138 280/730.2 |
| 2007/0102905 A1* | 5/2007 | Ryan | B60R 21/207 280/730.2 |
| 2010/0201108 A1* | 8/2010 | Iwayama | B60R 7/046 280/730.2 |
| 2019/0047504 A1* | 2/2019 | Sugishima | B60R 21/207 |
| 2019/0168703 A1* | 6/2019 | Sato | B60R 21/23138 |
| 2020/0180546 A1* | 6/2020 | Komura | B60R 21/23138 |
| 2022/0097641 A1* | 3/2022 | Sekizuka | B60R 21/207 |

FOREIGN PATENT DOCUMENTS

| | | |
|---|---|---|
| JP | H06191369 A | 7/1994 |
| JP | 2006-240545 A | 9/2006 |
| JP | 2008-030517 A | 2/2008 |
| JP | 2017-124789 A | 7/2017 |
| JP | 2019-131161 A | 8/2019 |

* cited by examiner

*Primary Examiner* — Karen Beck
(74) *Attorney, Agent, or Firm* — Dinsmore & Shohl LLP

(57) ABSTRACT

An occupant crash protection includes: a seat-side airbag device configured to deploy a seat-side gas cushion portion between an aisle and an occupant sitting on a seat, the seat-side airbag device being placed around the seat on which the occupant sits; and a wall-side airbag device configured to deploy a wall-side gas cushion portion toward the seat-side gas cushion portion to be deployed from the seat side to the aisle, the wall-side airbag device being placed inside a vehicle cabin wall.

3 Claims, 5 Drawing Sheets

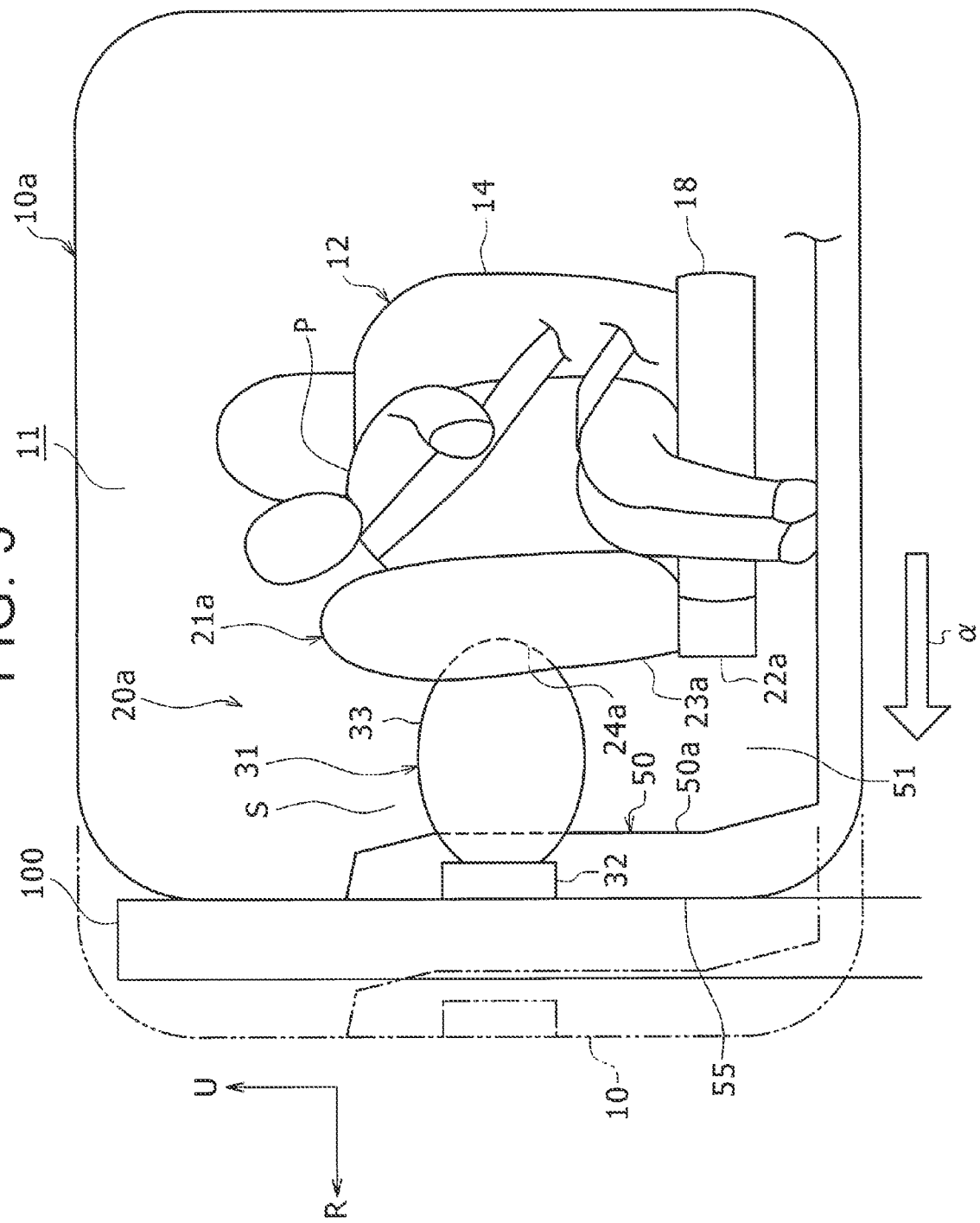

OCCUPANT CRASH PROTECTION FOR VEHICLE

CROSS-REFERENCE TO RELATED APPLICATION

This application claims priority to Japanese Patent Application No. 2020-163903 filed on Sep. 29, 2020, incorporated herein by reference in its entirety.

BACKGROUND

1. Technical Field

The present disclosure relates to an occupant crash protection for a vehicle. Particularly, in terms of the vehicle including an aisle between a side face of a seat in the vehicle width direction and a vehicle cabin wall facing the side face, the present disclosure relates to an occupant crash protection having an effect to restrain an occupant sitting on a seat from being thrown out to the aisle side at the time of a side collision and an effect to absorb an impact to be applied to the occupant.

2. Description of Related Art

Japanese Unexamined Patent Application Publication No. 06-191369 (JP 06-191369 A) describes an airbag device attached to a door panel beside a seat in a vehicle, and at the time when the vehicle has a collision, the airbag device deploys a gas cushion portion such that the gas cushion portion extends upward.

SUMMARY

In the configuration described in JP 06-191369 A, in a case where an aisle is formed between the seat and a vehicle cabin wall, a large space is formed by the aisle beside the seat. As a result, when the vehicle has a side collision (at the time of a side collision), an occupant may be greatly thrown out such that the occupant falls down to the aisle side, for example, and the occupant may receive a large impact from the vehicle.

In this respect, it is also conceivable that only a single body of the airbag device deploys the gas cushion portion between the seat and the vehicle cabin wall such that the gas cushion portion extends in the vehicle width direction. However, this case poses such a disadvantage that the single body of the airbag device is upsize and it takes time to deploy the gas cushion portion.

The present disclosure relates to an occupant crash protection for a vehicle including an aisle between a seat and a vehicle cabin wall, and an object of the present disclosure is to restrain an occupant sitting on the seat from being thrown out to the aisle side at the time of a side collision and to effectively absorb an impact to be applied to the occupant without excessively upsizing a single body of an airbag device.

An occupant crash protection for a vehicle according to the present disclosure is an occupant crash protection for a vehicle including a seat on which an occupant sits and an aisle between a side face of the seat in the vehicle width direction and a vehicle cabin wall facing the side face. The occupant crash protection includes a seat-side airbag device and a wall-side airbag device. The seat-side airbag device is configured to deploy a seat-side gas cushion portion between the aisle and the occupant sitting on the seat, and the seat-side airbag device is placed around the seat. The wall-side airbag device is configured to deploy a wall-side gas cushion portion toward the seat-side gas cushion portion to be deployed from the seat side to the aisle, and the wall-side airbag device is placed inside the vehicle cabin wall.

In the occupant crash protection according to the present disclosure, even in a case where a large space is provided due to the presence of the aisle between the seat and the vehicle cabin wall, a connecting body of the gas cushion portions continuous with each other in the vehicle width direction can be quickly formed in the space by the gas cushion portions deployed by these two airbag devices without excessively upsizing respective single bodies of the airbag devices. Hereby, without excessively upsizing the respective single bodies of the airbag devices, it is possible to restrain the occupant sitting on the seat from being thrown out to the aisle side at the time of a side collision of the vehicle and to effectively absorb an impact to be applied to the occupant In the occupant crash protection according to the present disclosure, the seat-side airbag device may be placed in a side portion placed in an end, in the vehicle width direction, of a seatback of the seat.

In the above configuration, the seat-side airbag device is not placed beside the occupant in a normal time when no collision occurs in the vehicle. Accordingly, the space between the occupant and the vehicle cabin wall is wide.

In the occupant crash protection according to the present disclosure, in a vehicle side view, the seat-side gas cushion portion may be deployed to be wider than the wall-side gas cushion portion. In a vehicle front view, the wall-side gas cushion portion may be deployed to be larger than the seat-side gas cushion portion in the width direction of the aisle.

In the above configuration, since the seat-side gas cushion portion is deployed widely near the occupant, the seat-side gas cushion portion easily protects the body of the occupant, and further, since the wall-side gas cushion portion is easily deployed quickly and largely in the width direction of the aisle, the connecting body of the gas cushion portions can be easily and more quickly formed so as to close the aisle.

In the occupant crash protection according to the present disclosure, either one of the seat-side gas cushion portion and the wall-side gas cushion portion may include a recessed portion configured to receive the other one of the seat-side gas cushion portion and the wall-side gas cushion portion in a deployed state.

With the above configuration, when the gas cushion portions are brought into a deployed state, the connecting body of the gas cushion portions can be easily formed stably.

With the occupant crash protection according to the present disclosure, without excessively upsizing respective single bodies of the airbag devices, it is possible to restrain the occupant sitting on the seat from being thrown out to the aisle side at the time of a side collision of the vehicle and to effectively absorb an impact to be applied to the occupant.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 3 is viewed from the right side of the vehicle; and FIG. 5 is a schematic cross-sectional view of a vehicle front part into which an occupant crash protection for a vehicle according to another example of the embodiment of the present disclosure is incorporated.

DETAILED DESCRIPTION OF EMBODIMENTS

With reference to the drawings, the following describes an occupant crash protection for a vehicle according to an embodiment. In this description, specific shapes, materials, values, arrangement positions, and the like are examples to facilitate understanding of the present disclosure and can be modified appropriately in conformity to specifications. Further, an arrow F, an arrow U, and an arrow R illustrated in each figure indicate a front direction, an upper direction, and a right direction in the vehicle, respectively. Further, directions reverse to the arrows F, U, R indicate a rear direction, a lower direction, and a left direction in the vehicle, respectively.

Figure 1:
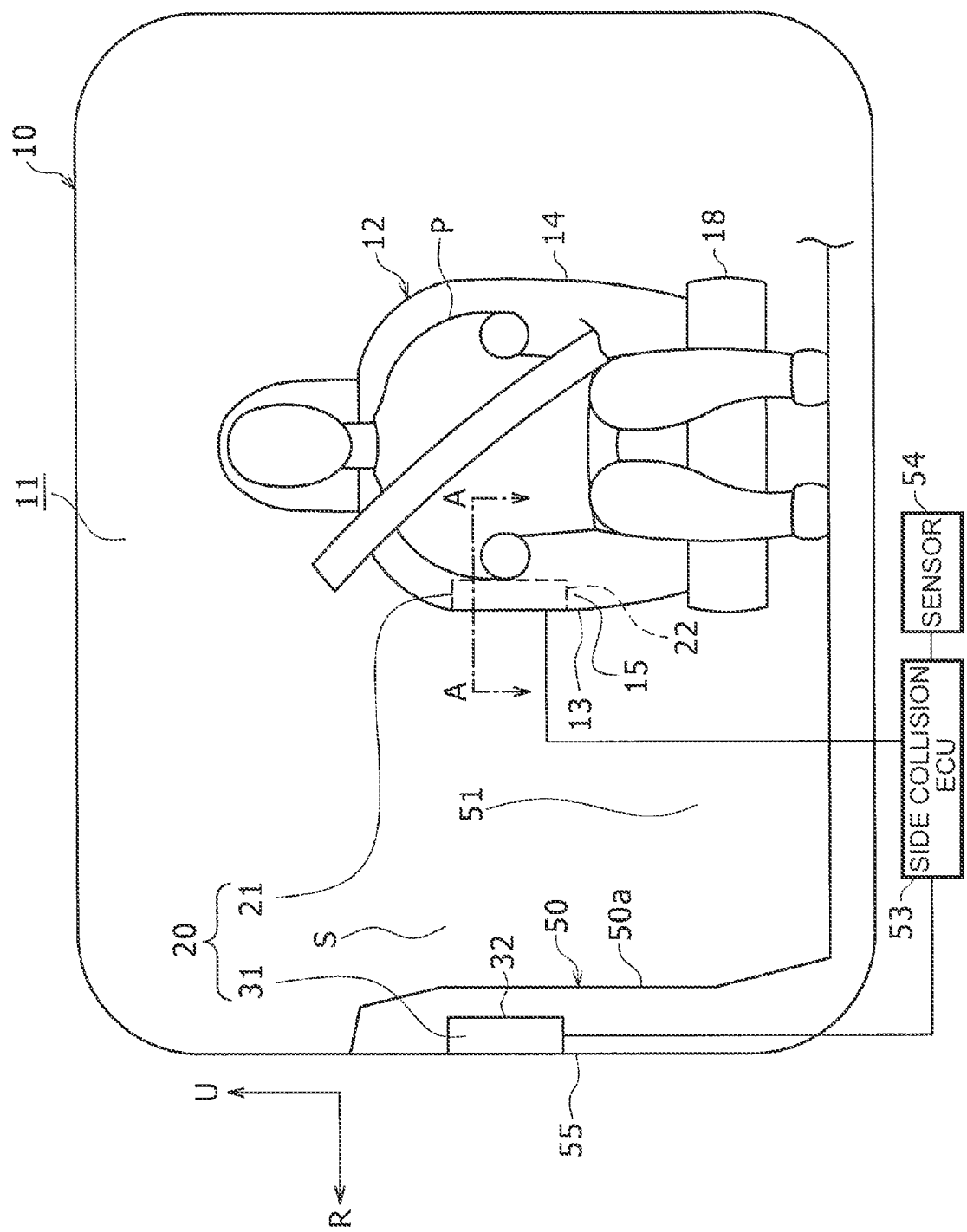
FIG. 1 is a schematic cross-sectional view of a vehicle front part into which an occupant crash protection for a vehicle according to an embodiment of the present disclosure is incorporated.

FIG. 1 is a schematic cross-sectional view of a front part of a vehicle 10 into which an occupant crash protection 20 according to the embodiment is incorporated. The vehicle 10 is a bus-shaped vehicle configured such that an operator seat 12 on which an operator as an occupant sits is placed on the front side in a vehicle cabin 11, and a plurality of passenger seats (not shown) on which a plurality of passengers can sit is placed behind the operator seat 12. The vehicle 10 is basically operated in an automated manner. For example, the passengers can sit on either side of the vehicle 10 behind the operator seat 12 and get in and off the vehicle 10 through a doorway (not shown) configured to be opened and closed by a door. The operator can sit on the operator seat 12 and perform operations such as start and stop of the vehicle and open and close of the door as needed. Note that, the vehicle 10 may not be a self-driving vehicle and may be configured such that the operator regularly drives the vehicle 10 by use of a steering wheel and an accelerator pedal. In FIG. 1, the operator seat 12 may be placed in the center of the vehicle cabin 11 in the vehicle width direction. Note that, in each figure, a dummy P for impact test sits on the operator seat 12, instead of an actual operator. In the following description, for description of the position of the operator sitting on the operator seat 12, the dummy P may be referred to as an operator P.

In the vehicle 10, an aisle 51 is provided between a right side face 13 that is a side face of the operator seat 12 in the vehicle width direction and a vehicle cabin wall 50 facing the right side face 13. The operator or the passengers can pass the aisle 51. Hereinafter, the operator seat 12 is referred to as the seat 12. The following mainly describes a case where the aisle 51 is formed on the right side in the vehicle cabin 11 of the vehicle 10.

The occupant crash protection 20 includes a seat-side airbag device 21 and a wall-side airbag device 31. The seat-side airbag device 21 is placed around the seat 12. When a side collision of the vehicle 10 is detected, the seat-side airbag device 21 deploys a seat-side gas cushion portion 23 (FIGS. 2 to 4) between the aisle 51 and the operator P sitting on the seat 12.

More specifically, the seat 12 includes a generally upright seatback 14 and a seat cushion 18 having a seating face. The seat-side airbag device 21 is placed in a side portion 15 placed in a right end, in the vehicle width direction, of the seatback 14 of the seat 12. At this time, the seat-side gas cushion portion 23 is placed in a folded state inside a first case 22 of the seat-side airbag device 21, and the first case 22 is placed inside the side portion 15 of the seatback 14.

Figure 2:
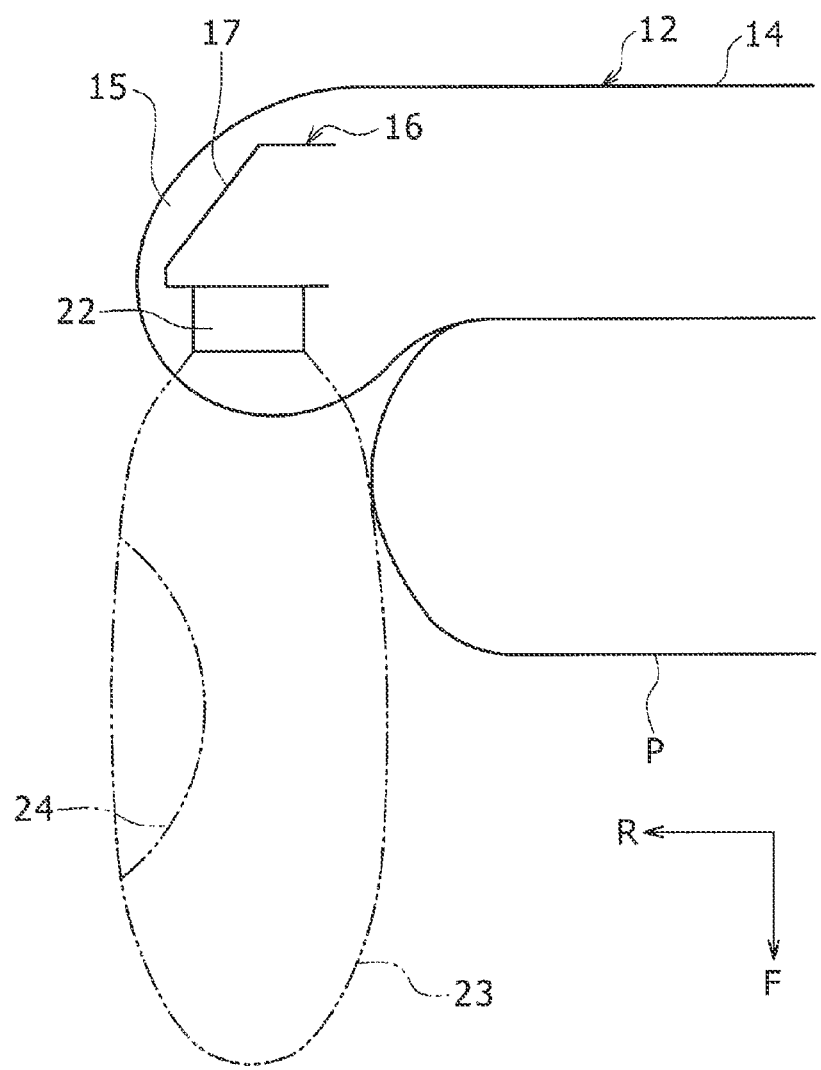
FIG. 2 is a schematic view of a section taken along a line A-A in FIG. 1.

The following describes more details with reference to FIG. 2. FIG. 2 illustrates a section taken along a line A-A in FIG. 1. The first case 22 is placed in the side portion 15 of the seatback 14 in a seatback frame 16 forming the seatback 14 such that the first case 22 is fixed to the front side of a side support portion 17 extending in the up-down direction. The seatback frame 16 is made of metal and forms a framework of the seatback 14.

A first inflator (not shown) is fixed to the inside of the first case 22. The first inflator includes an ignition agent, a gas generation portion, and a gas emission port. A side collision ECU 53 illustrated in FIG. 1 is electrically connected to the first inflator. A gas feed opening (not shown) of the seat-side gas cushion portion 23 is connected to the gas emission port. The seat-side gas cushion portion 23 is formed in a bag shape, for example, such that two fabric materials made of nylon-based resin or polyester-based resin are put on to face each other in the vehicle width direction in a deployed state, and outer peripheral edge portions of the fabric materials are sewn to each other. In a normal time when no collision occurs in the vehicle, the seat-side gas cushion portion 23 is housed in the first case 22 in a folded state.

A sensor 54 configured to detect a side collision of the vehicle is electrically connected to the side collision ECU 53. The sensor 54 is an acceleration sensor, a pressure sensor, or the like. The side collision ECU 53 is configured to activate the first inflator at the time when the side collision ECU 53 detects a side collision based on an output from the sensor 54. When the first inflator is activated, the ignition agent is fired, so that gas generated in the gas generation portion is emitted from the gas emission port. Hereby, the gas is filled into the gas feed opening of the seat-side gas cushion portion 23 from the gas emission port, so that the seat-side gas cushion portion 23 is expanded and deployed. At this time, the seat-side gas cushion portion 23 breaks through a seat pad and a seat skin that form the seatback 14 on the front side of the first case 22.

Figure 3:
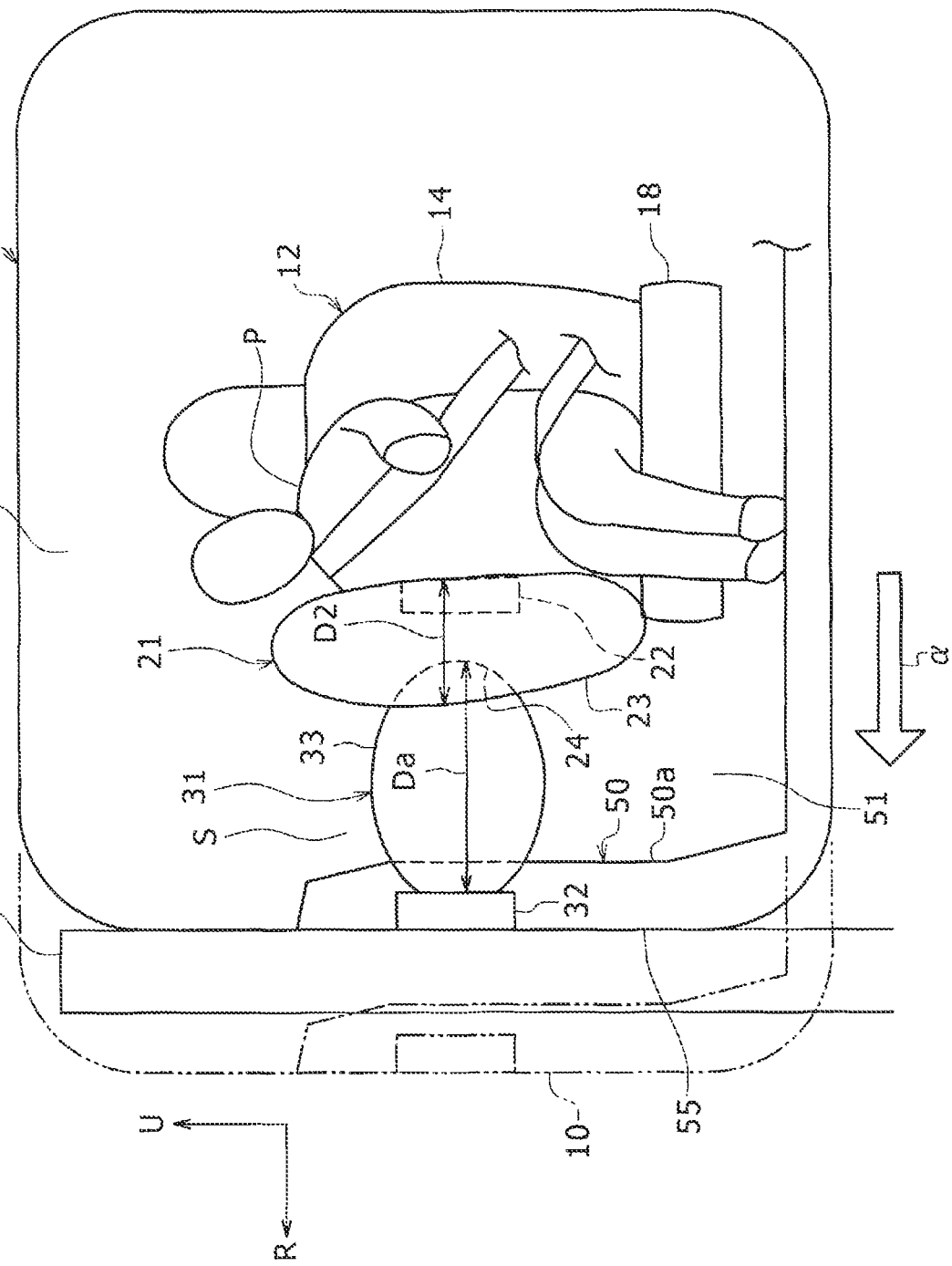
FIG. 3 is a view corresponding to FIG. 1 and illustrates a state where seat-side and wall-side airbag devices are activated when the vehicle has slid to an arrow-a direction in FIG. 3 and has collided with a test pole in a side collision test of the vehicle.
Figure 4:
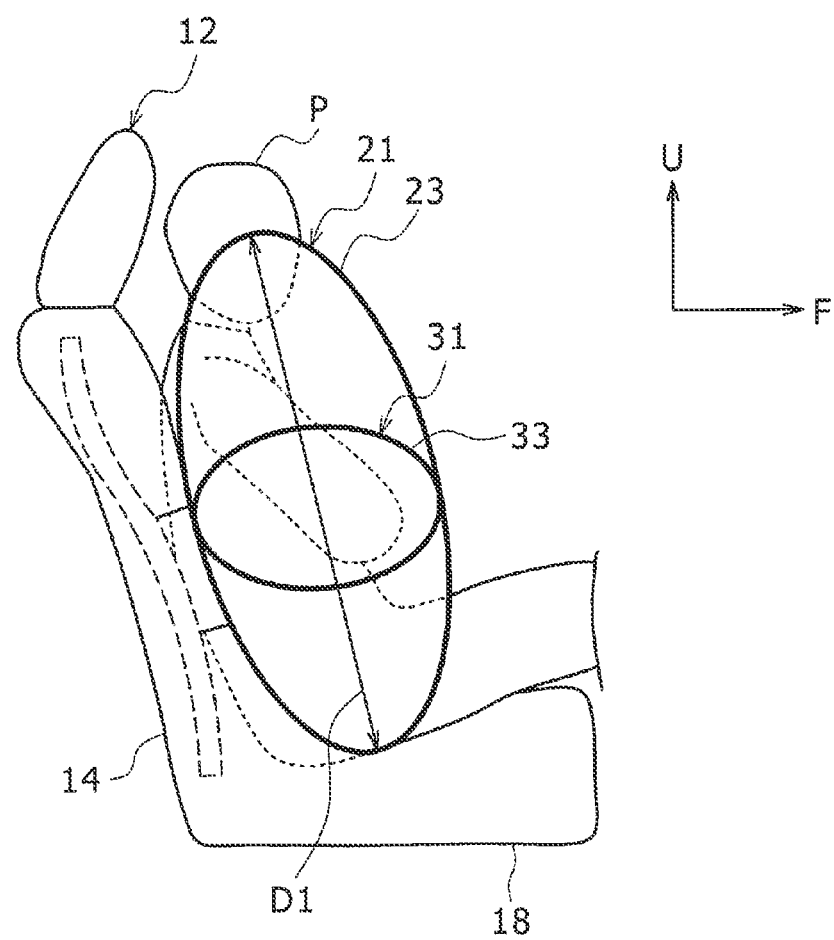
FIG. 4 is a view illustrating a positional relationship between a seat-side gas cushion portion and a wall-side gas cushion portion when

FIG. 3 illustrates a state where the seat-side and wall-side airbag devices 21, 31 are activated when the vehicle 10 has slid to an arrow-a direction in FIG. 3 and has collided with a test pole 100 in a side collision test of the vehicle 10. In the side collision test in FIG. 3, the vehicle 10 collides with the test pole 100 at a predetermined speed in the arrow-a direction in a state where the vehicle 10 is placed on a wagon (not shown). The test pole 100 is provided in a standing manner in the up-down direction. FIG. 4 illustrates a positional relationship between the seat-side and wall-side gas cushion portions 23, 33 when FIG. 3 is viewed from the right side of the vehicle.

As illustrated in FIGS. 2 to 4, in a deployed state, the seat-side gas cushion portion 23 expands in the up-down direction and in the front direction and also expands in the vehicle width direction such that the seat-side gas cushion portion 23 is deployed from the seat 12 side to the aisle 51. As will be described later, when the vehicle 10 has a side collision, the seat-side gas cushion portion 23 is connected, in the vehicle width direction, to the wall-side gas cushion portion 33, of the wall-side airbag device 31, that is deployed to the seat 12 side from the vehicle cabin wall 50 side, so that the seat-side gas cushion portion 23 can protect the operator P (the occupant) by restraining the operator P from being thrown out to the aisle 51 side. The seat-side gas cushion portion 23 has a shape elongated along a diagonally up-down direction in a vehicle side view as illustrated in FIG. 4. The seat-side gas cushion portion 23 is deployed in a shape in which a length D2 in the vehicle width direction (FIG. 3) is smaller than a length D1 (FIG. 4) in the longitudinal direction.

Further, the seat-side gas cushion portion 23 has a recessed portion 24 (see FIG. 3) formed in a central part of a surface, on the aisle 51 side, of the seat-side gas cushion portion 23 in a deployed state such that the recessed portion 24 receives a distal end part of the wall-side gas cushion portion 33 of the wall-side airbag device 31 (described later). Hereby, when two gas cushion portions 23, 33 are both brought into a deployed state, a connecting body of the two gas cushion portions 23, 33 can be easily formed stably.

The recessed portion 24 is, for example, a spherical-surface recess or a conical-surface recess. For example, the recessed portion 24 may be formed such that a part, of an inner surface of the seat-side gas cushion portion 23, at a position corresponding to a back surface of the recessed portion 24 is connected to a part, of the inner surface, at a position opposite to the recessed portion 24 by a tether made of one or more belt-shaped cloth pieces so that the tether is stretched when the seat-side gas cushion portion 23 is brought into a deployed state. Further, the recessed portion 24 may be formed three-dimensionally in a folded state in advance in such a manner that a separate fabric material is sewn to a part, of the seat-side gas cushion portion 23, where the recessed portion 24 is to be formed, so that its three-dimensional shape is maintained in a deployed state.

Further, a friction material may be attached to an inner surface of the recessed portion 24 of the seat-side gas cushion portion 23 so as to restrain slip between the inner surface of the recessed portion 24 and the distal end part of the wall-side gas cushion portion 33, or coating may be performed on the inner surface of the recessed portion 24 so as to increase a frictional force. Hereby, the connecting body of the seat-side gas cushion portion 23 and the wall-side gas cushion portion 33 can be formed more stably. For example, as the frictional material, a nonslip sheet made of a rubber material or a material formed by finely foaming a thermo-setting resin layer may be attached to the recessed portion 24. As the frictional material, a mesh-shaped nonslip sheet made of resin such as polyvinylchloride (PVC) may be attached to the recessed portion 24. Further, as the coating, a coating layer made of a material formed by finely foaming a thermosetting resin layer may be formed on the inner surface of the recessed portion 24.

In the meantime, the wall-side airbag device 31 is placed inside the vehicle cabin wall 50 under a side window, and when a side collision of the vehicle 10 is detected, the wall-side gas cushion portion 33 is deployed toward the seat-side gas cushion portion 23 that is deployed from the seat 12 side to the aisle 51.

More specifically, inside an indoor trim 50a made of resin and forming the vehicle cabin wall 50, the wall-side airbag device 31 includes a second case 32 fixed to a vehicle cabin side of an outer panel 55 forming a vehicle outer surface, and the wall-side gas cushion portion 33 (FIG. 3) housed inside the second case 32 in a folded state. The second case 32 may be fixed to a vehicle cabin side of a door inner panel inside the indoor trim. Similarly to the seat-side airbag device 21, a second inflator (not shown) is fixed to the inside of the second case 32. The side collision ECU 53 is electrically connected to the second inflator. A gas feed opening of the wall-side gas cushion portion 33 is connected to a gas emission port of the second inflator. The configuration of the wall-side airbag device 31 is similar to that of the seat-side airbag device 21 except the shape of the wall-side gas cushion portion 33 in a deployed state. In a normal time when no collision occurs in the vehicle, the wall-side gas cushion portion 33 is housed in the second case 32 in a folded state.

When the side collision ECU 53 detects a side collision based on an output from the sensor 54, the side collision ECU 53 activates the second inflator at the same time as the first inflator. When the second inflator is activated, an ignition agent is fired, so that gas is generated in a gas generation portion and emitted from the gas emission port. Hereby, the gas is filled into the gas feed opening of the wall-side gas cushion portion 33 from the gas emission port of the second inflator, so that the wall-side gas cushion portion 33 is expanded and deployed. At this time, the wall-side gas cushion portion 33 is deployed to the aisle 51 through an opening formed by breaking a rectangular or generally U-shaped thin part formed in the indoor trim 50a from the inside of the second case 32 in the vehicle width direction.

In a deployed state, the wall-side gas cushion portion 33 expands inwardly in the vehicle width direction as illustrated in FIG. 3. Hereby, when the vehicle has a side collision, the wall-side gas cushion portion 33 is deployed toward the seat-side gas cushion portion 23 deployed from the seat 12 side to the aisle 51. At this time, the wall-side gas cushion portion 33 also expands in the up-down direction and in the vehicle front-rear direction, but the amounts of expansion in those directions are smaller than the amount of expansion to the inner side in the vehicle width direction. For example, as illustrated in FIGS. 3, 4, the wall-side gas cushion portion 33 is deployed in a shape elongated in the vehicle width direction and in a shape in which a length Da in the vehicle width direction is larger than the lengths thereof in the up-down direction and in the front-rear direction. At this time, in a vehicle side view as illustrated in FIG. 4, the seat-side gas cushion portion 23 is deployed to be wider than the wall-side gas cushion portion 33, and in a vehicle front view as illustrated in FIG. 3, the wall-side gas cushion portion 33 is deployed to be larger than the seat-side gas cushion portion 23 in the width direction of the aisle 51.

Then, a load caused by a side collision is applied to the wall-side airbag device 31 and the seat-side airbag device 21 from outside a first side in the vehicle width direction as the aisle 51 side of the vehicle, so that the distal end part of the deployed wall-side gas cushion portion 33 is received by the recessed portion 24 of the deployed seat-side gas cushion portion 23 and connected to the recessed portion 24. Note that, similarly to the inner surface of the recessed portion 24, a friction material may be attached to an outer surface of the distal end part of the wall-side gas cushion portion 33 to be received by the recessed portion 24 so as to restrain slip between the recessed portion 24 and the distal end part of the wall-side gas cushion portion 33, or coating may be performed on the outer surface of the distal end part of the wall-side gas cushion portion 33 so as to increase a frictional force. Further, the friction material may be attached to or the coating may be performed only on either of the recessed portion 24 and the distal end part of the wall-side gas cushion portion 33, provided that slip between the recessed portion 24 and the distal end of the wall-side gas cushion portion 33 can be sufficiently restrained.

With the occupant crash protection 20, even in a case where a large space S is provided due to the presence of the aisle 51 between the seat 12 and the vehicle cabin wall 50, the connecting body of the gas cushion portions 23, 33 continuous with each other in the vehicle width direction can be quickly formed in the space S by the gas cushion portions 23, 33 deployed by the two airbag devices 21, 31 without excessively upsizing respective single bodies of the airbag devices 21, 31. Accordingly, without excessively upsizing the respective single bodies of the airbag devices 21, 31, it is possible to restrain the operator P sitting on the seat 12 from being thrown out to the aisle 51 side when the vehicle has a side collision, and it is possible to effectively absorb an impact to be applied to the operator P.

For example, at the time of a side collision as illustrated in FIG. 3, in a state where the seat-side and wall-side airbag devices 21, 31 are activated so that the gas cushion portions 23, 33 are deployed, the two gas cushion portions 23, 33 are connected to each other in the vehicle width direction. Hereby, even in a case where the operator P is to be thrown out from the seat 12 in a direction where the operator P falls down to the aisle 51 side at the time of the side collision, it is possible to restrain the operator P from being greatly thrown out to the aisle 51 side and to effectively absorb an impact to be applied to the operator P.

In the meantime, as a comparative example, it is also conceivable that a gas cushion portion is deployed between a seat and a vehicle cabin wall only by a single body of an airbag device, that is, only by a vehicle-side airbag device or a seat-side airbag device so that the gas cushion portion extends in the vehicle width direction, and hereby, the gas cushion portion is stretched between an occupant sitting on the seat and the vehicle cabin wall. However, this case poses such a disadvantage that the single body of the airbag device is upsized and it takes time to deploy the gas cushion portion. Further, in a case where the gas cushion portion is upsized, the generation amount of gas increases, so that it is difficult to deploy the gas cushion portion accurately and stably. Accordingly, in an Out-of-Position test that is an evaluation test to an occupant in a position other than a normal sitting position, it is highly necessary to provide a special structure in order to prevent damages to the occupant in the position other than the normal sitting position, e.g., a damage that the gas cushion portion hits and throws the occupant or causes the occupant to fall down.

Further, since the seat-side airbag device 21 is placed in the side portion 15 of the seatback 14 of the seat 12, the seat-side airbag device 21 is not placed beside the operator P in a normal time when no collision occurs in the vehicle. Hereby, the space between the operator P and the vehicle cabin wall 50 is wide.

Further, in a vehicle side view, the seat-side gas cushion portion 23 is deployed to be wider than the wall-side gas cushion portion 33, and in a vehicle front view, the wall-side gas cushion portion 33 is deployed to be larger than the seat-side gas cushion portion 23 in the width direction of the aisle 51. Hereby, since the seat-side gas cushion portion 23 is deployed widely near the operator P, the seat-side gas cushion portion 23 easily protects the body of the operator P, and further, since the wall-side gas cushion portion 33 is quickly deployed largely in the width direction of the aisle 51, the connecting body of the gas cushion portions 23, 33 can be more quickly formed so as to close the aisle 51. Further, as illustrated in FIG. 4, in a vehicle side view, the whole wall-side gas cushion portion 33 may be included inside the seat-side gas cushion portion 23, from the viewpoint that the deployment length of the wall-side gas cushion portion 33 in the vehicle width direction can be easily made large without excessively upsizing the wall-side gas cushion portion 33.

Note that, in the present embodiment, the deployment timing of the gas cushion portions 23, 33 of the seat-side airbag device 21 and the wall-side airbag device 31 is not limited to the time when a side collision of the vehicle is detected. When a control device determines that an abnormality with a possibility of a side collision occurs, the gas cushion portions 23, 33 may be deployed. For example, when the control device provided in the vehicle determines, based on an output from a sensor such as an acceleration sensor of the vehicle, that it is difficult to determine whether the vehicle has a front collision or a side collision, the gas cushion portions 23, 33 may be deployed.

FIG. 5 is a cross-sectional view of a front part of a vehicle 10a into which an occupant crash protection 20a according to another example of the embodiment is incorporated. In a case of this example, a seat-side airbag device 21a includes a first case 22a attached to an end part, on the aisle 51 side, of the seat cushion 18, and a seat-side gas cushion portion 23a housed inside the first case 22a in a folded state. In a deployed state, the seat-side gas cushion portion 23a expands in the upper direction and in the front-rear direction and also expands in the vehicle width direction, so that the seat-side gas cushion portion 23a is deployed from the seat 12 side to the aisle 51. When the vehicle has a side collision, the seat-side gas cushion portion 23a is connected to the wall-side gas cushion portion 33 of the wall-side airbag device 31 deployed to the seat 12 side from the vehicle cabin wall 50 side, so that the seat-side gas cushion portion 23a can protect the occupant by restraining the occupant from being thrown out to the aisle 51 side. At this time, the distal end part of the wall-side gas cushion portion 33 is received by a recessed portion 24a formed in the seat-side gas cushion portion 23a. The shape of the seat-side gas cushion portion 23a at the time of deployment is similar to that of the seat-side gas cushion portion 23 illustrated in FIGS. 2 to 4. Other configurations and effects of the present example are similar to those in the configuration of FIGS. 1 to 4.

In the examples, the recessed portion 24, 24a configured to receive the wall-side gas cushion portion 33 in a deployed state is formed in the seat-side gas cushion portion 23, 23a. However, a recessed portion configured to receive the seat-side gas cushion portion 23, 23a in a deployed state may be formed in the wall-side gas cushion portion 33.

Further, the above description deals with a case where the seat-side and wall-side airbag devices 21, 21a, 31 include the cases 22, 22a, 32 in which the gas cushion portions 23, 23a, 33 are housed. In the meantime, either or both of the seat-side and wall-side airbag devices may not include a case, and the inflator may be directly fixed to a seat frame or a vehicle body.

Further, in the above description, either one of the seat-side gas cushion portion 23, 23a and the wall-side gas cushion portion 33 includes the recessed portion 24, 24a configured to receive the other one of them. However, the seat-side and wall-side gas cushion portions may be both configured not to include the recessed portion. For example, the seat-side gas cushion portion and the wall-side gas cushion portion may be configured such that, in a deployed state, flat portions are formed in respective contact portions of the seat-side gas cushion portion and the wall-side gas cushion portion so that these two gas cushions are connected at the flat portions.

Further, the above description deals with a case where the aisle 51 is formed on the right side of the seat 12 in the vehicle cabin 11, the seat-side airbag device 21, 21a is placed on the right side as the aisle 51 side of the seat 12, and the wall-side airbag device 31 is placed in the vehicle cabin wall 50 provided in a right end of the vehicle cabin 11, the right end facing the aisle 51. In the meantime, aisles may be formed on both the right and left sides of the seat 12, or an aisle may be formed only on the left side, a seat-side airbag device may be placed on the left side of the seat 12, and a wall-side airbag device may be placed in a vehicle cabin wall provided in a left end of the vehicle cabin 11, so that the seat-side airbag device and the wall-side airbag device are deployed to approach each other.

Further, the above description deals with a case where the seat configured such that the seat-side airbag device 21, 21a is provided in the peripheral portion of the seat is the seat on which the operator P sits. However, the seat configured such that the seat-side airbag device is provided in the peripheral portion of the seat may be a passenger seat on which a passenger as the occupant sits. In this case, the seat-side gas cushion portion is deployed between the aisle and the passenger sitting on the passenger seat. Further, the wall-side airbag device configured to deploy the wall-side gas cushion portion toward the seat-side gas cushion portion to be deployed from the seat side to the aisle is provided in the vehicle cabin wall.

Further, the vehicle is not limited to a bus-shaped vehicle and may be other types of vehicles including an aisle facing a side face of a seat in the vehicle width direction.

What is claimed is:

1. An occupant crash protection for a vehicle including a seat on which an occupant sits and an aisle between a side face of the seat in a vehicle width direction and a vehicle cabin wall facing the side face, the occupant crash protection comprising:

a seat-side airbag device configured to deploy a seat-side gas cushion portion between the aisle and the occupant sitting on the seat, the seat-side airbag device being placed around the seat; and a wall-side airbag device configured to deploy a wall-side gas cushion portion toward the seat-side gas cushion portion to be deployed from the seat side to the aisle, the wall-side airbag device being placed inside the vehicle cabin wall, the seat-side airbag device is separate from the wall-side airbag device, the wall-side gas cushion portion is deployed in a shape elongated in the vehicle width direction and that has a length in the vehicle width direction, a length in an up-down direction, and a length in a front-rear direction, the length in the vehicle width direction is larger than the length in the up-down direction and the length in the front-rear direction, wherein the seat-side gas cushion portion includes a recessed portion configured to receive the wall-side gas cushion portion in a deployed state, and the recessed portion of the seat-side gas cushion portion is formed in a central part of a surface on the aisle side of the seat-side gas cushion portion, the recessed portion of the seat-side gas cushion portion configured to receive a distal end part of the wall-side gas cushion portion.

2. The occupant crash protection according to claim 1, wherein the seat-side airbag device is placed in a side portion placed in an end, in the vehicle width direction, of a seatback of the seat.

3. The occupant crash protection according to claim 1, wherein:

in a vehicle side view, the seat-side gas cushion portion is deployed to be wider than the wall-side gas cushion portion; and in a vehicle front view, the wall-side gas cushion portion is deployed to be larger than the seat-side gas cushion portion in a width direction of the aisle.

* * * * *